United States Patent [19]

Nelson

[11] Patent Number: 5,291,697

[45] Date of Patent: Mar. 8, 1994

[54] SURFACE ABRADING MACHINE HAVING TRANSVERSE OSCILLIATION

[75] Inventor: Robert T. Nelson, Oklahoma City, Okla.

[73] Assignee: Nelco Acquisition Corporation, Oklahoma City, Okla.

[21] Appl. No.: 897,223

[22] Filed: Jun. 11, 1992

[51] Int. Cl.⁵ .............................................. B24C 3/06
[52] U.S. Cl. ........................................ 51/429; 51/425
[58] Field of Search ............... 51/429, 415, 416, 410, 51/424, 425

[56] References Cited

U.S. PATENT DOCUMENTS

| | | | |
|---|---|---|---|
| 2,204,610 | 6/1940 | Minich | 51/9 |
| 2,254,234 | 9/1941 | Minich | 51/9 |
| 2,635,745 | 4/1953 | Mead et al. | 209/35 |
| 2,684,558 | 7/1954 | Harris | 51/429 X |
| 2,766,557 | 10/1956 | Pollard | 51/8 |
| 2,850,162 | 9/1958 | Widmer | 209/134 |
| 3,034,262 | 5/1962 | Pawlson | 51/9 |
| 3,262,228 | 7/1966 | Schenck | 51/9 |
| 3,380,196 | 4/1968 | Mabille | 51/9 |
| 3,436,866 | 4/1969 | Nye | 51/416 |
| 3,608,968 | 9/1971 | Burnett | 299/39 |
| 3,756,377 | 9/1973 | Goff | 51/9 |
| 3,877,175 | 4/1975 | Snyder | 51/9 |
| 3,900,969 | 8/1975 | Diehn | 51/9 |
| 3,906,673 | 9/1975 | Goto | 51/9 |
| 3,934,372 | 1/1976 | Diehn | 51/8 |
| 3,934,373 | 1/1976 | Leliaert | 51/9 |
| 3,977,128 | 8/1976 | Goff | 51/9 |
| 3,981,104 | 9/1976 | Dreher | 51/9 |
| 4,020,596 | 5/1977 | Bergh | 51/9 |
| 4,035,958 | 7/1977 | Nishio | 51/425 |
| 4,052,820 | 10/1977 | Bergh | 51/423 |
| 4,222,205 | 9/1980 | Lake et al. | 51/420 |
| 4,309,850 | 1/1982 | Benson | 51/429 |
| 4,336,671 | 6/1982 | Nelson | 51/424 |
| 4,364,823 | 12/1982 | Goff | 209/135 |
| 4,376,358 | 3/1983 | Shelton | 51/429 |
| 4,377,922 | 3/1983 | Bergh | 51/424 |
| 4,377,923 | 3/1983 | Bergh | 51/424 |
| 4,377,924 | 3/1983 | Bergh | 51/429 |
| 4,382,352 | 5/1983 | Nelson | 51/424 |
| 4,416,092 | 11/1983 | Nelson | 51/425 |
| 4,470,226 | 9/1984 | Williams | 51/416 |
| 4,683,684 | 8/1987 | Yie | 51/410 |
| 4,941,296 | 7/1990 | Carpenter | 51/433 |

FOREIGN PATENT DOCUMENTS

| | | | |
|---|---|---|---|
| 32161 | 7/1981 | European Pat. Off. | |
| 2407674 | 10/1974 | Fed. Rep. of Germany | 51/429 |
| 2900 | of 1870 | United Kingdom | |
| 487532 | 6/1938 | United Kingdom | |
| 2203368 | 3/1988 | United Kingdom | |

Primary Examiner—Robert A. Rose
Attorney, Agent, or Firm—Dunlap, Codding & Lee

[57] ABSTRACT

A mobile machine for abrading a surface by propelling abrasive material against the surface from a blast assembly which moves from side to side of the machine. The machine includes a wheeled frame with a pair of parallel track members mounted across the frame. The blast assembly is supported on rollers which travel upon the track members. A coupling with a worm drive bore is mounted to the front and the rear of the blast assembly. A motor-drive worm drive shaft is journaled through each worm drive bore to move the blast assembly back and forth across the frame. The blast assembly includes a blast housing with a blast corridor and a blast opening to the surface being abraded, a hopper to gravity feed abrasive material into the blast corridor, a centrifugal blast wheel with rotating blades which propel abrasive material against the surface, a return corridor and an air wash. A remote dust collector is connected to the air wash to draw air and abrasive material from the blast opening to the air wash. Abrasive material falls from the air wash into the hopper for reuse. A vacuum blower attached to an on-board dust collector or a cyclone separator may be mounted upon the air wash to provide additional air flow for the return of abrasive material to the air wash and the hopper.

25 Claims, 8 Drawing Sheets

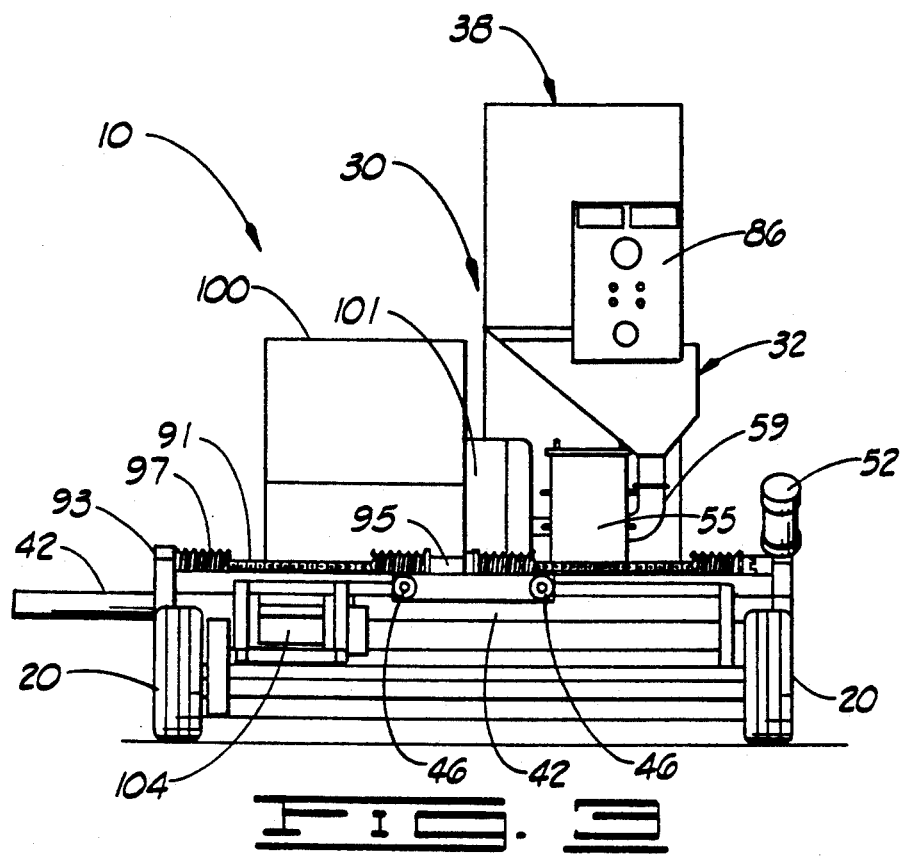
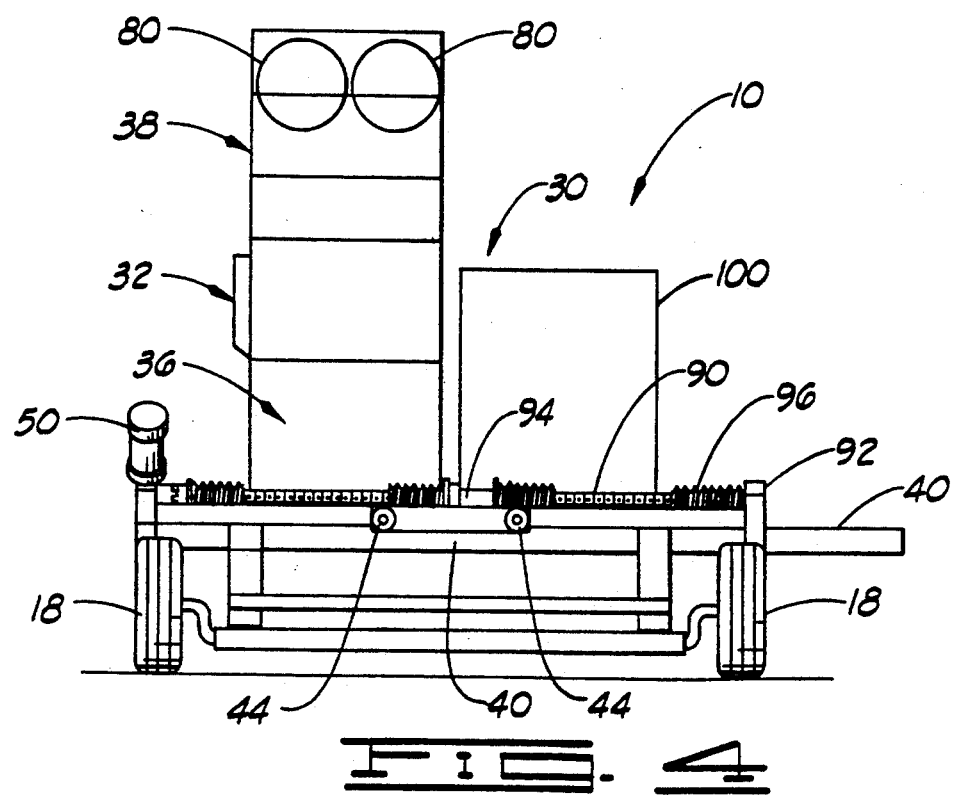

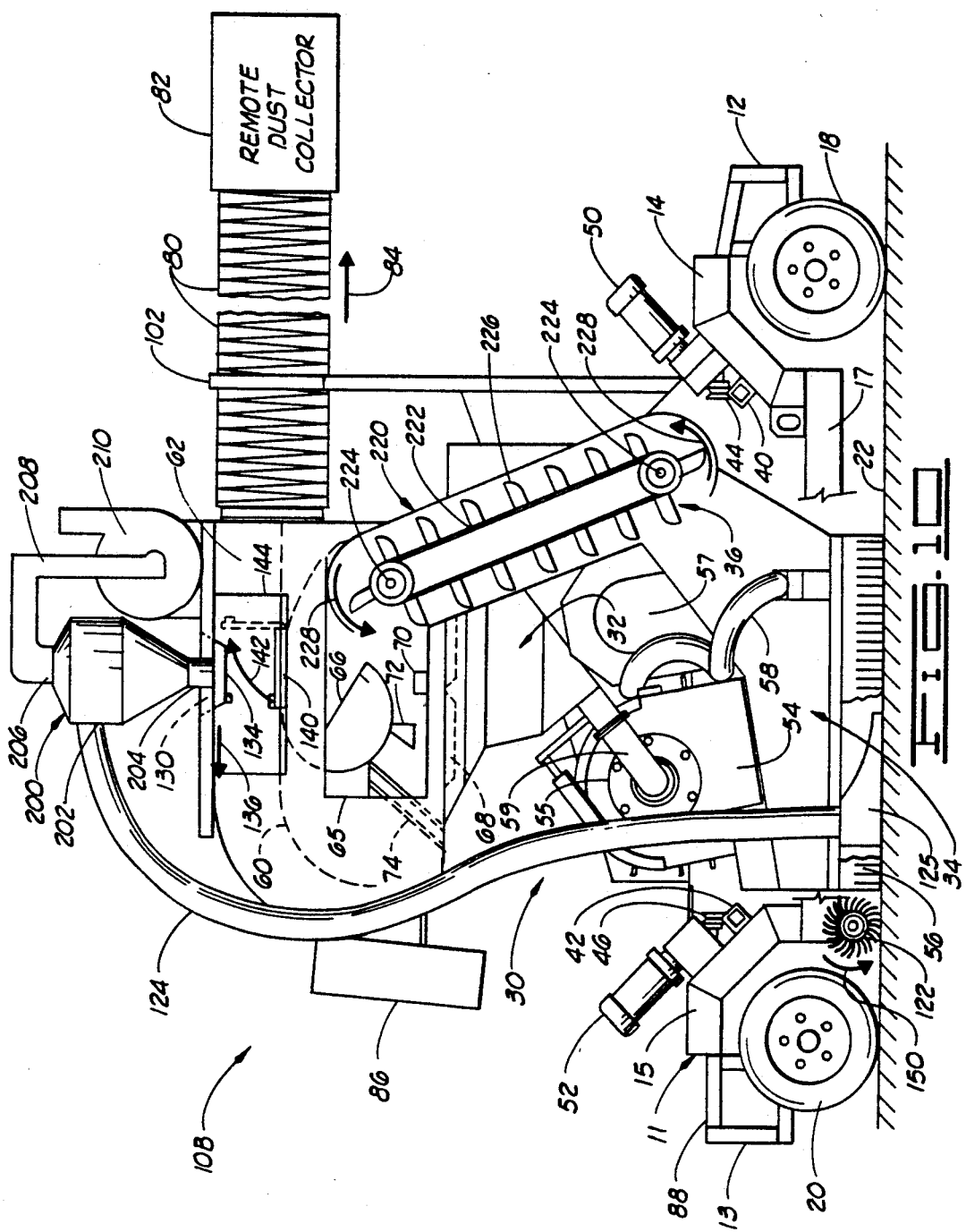

SURFACE ABRADING MACHINE HAVING TRANSVERSE OSCILLIATION

BACKGROUND OF THE INVENTION

1. Field of the Invention

The present invention relates to machines for abrading a surface and, more particularly, but not by way of limitation, to machines for removing an upper layer of concrete in a road, a bridge, an airport runway or an airport taxiway.

2. Description of Related Art

Various machines have been used to remove an upper layer of a worn concrete surface in preparation for resurfacing. The familiar pneumatic hammer, or jack hammer, is one tool for concrete removal. Breaking up concrete with a jack hammer is, however, a slow and labor-intensive process. Moreover, the stress and vibration from a jack hammer may fracture or damage supporting structures.

Milling machines are also devices for concrete removal. The cutters of milling machines are rotated against the concrete to cut away the concrete. A problem with these devices is that the rotating cutters may damage or grab the metal reinforcing grid in the concrete.

Hydrodemolition may also be utilized to remove concrete. By directing jets of water under high pressure against the concrete, the concrete is eroded away. Unfortunately, the slurry created by hydrodemolition may be difficult to contain. The use of hydrodemolition on bridges makes control of the slurry even more problematic. Bridges often span rivers and streams and it is undesirable for the slurry from hydrodemolition to run into the river or stream below a bridge.

SUMMARY OF THE INVENTION

The present invention comprises a blast housing supported upon a wheeled frame. The blast housing has a blast corridor, a hopper for feeding abrasive material into the blast corridor, a blast opening to the surface to be abraded, a return corridor and an air wash.

A centrifugal blast wheel with a plurality of rotating blades is mounted to the blast housing. The blades extend into the blast corridor to propel abrasive material through the blast opening against the surface to be abraded.

Spent abrasive material travels through the return corridor into the air wash. From the air wash, the abrasive material falls back into the hopper for reuse.

The frame includes two parallel track members which extend across the frame. The blast housing is supported for side-to-side travel on the track members. A rotating worm shaft runs along each track member and is journaled through a coupling of the blast housing to drive the transverse movement of the blast housing. As the blast housing moves on the track members, the blast opening moves back and forth over the surface between the sides of the frame to abrade the surface.

One object of the present invention is to provide an abrading machine which removes concrete quickly and efficiently.

Another object of the present invention is to provide an abrading machine which contains the dust and debris produced by abrading the surface.

Yet another object of the present invention is provide an abrading machine which minimizes the damage to bridge supports or reinforcing bars in the concrete.

Other objects, advantages and features of the present invention are apparent from the following detailed description when read in conjunction with the accompanying drawings and appended claims.

BRIEF DESCRIPTION OF THE DRAWINGS

FIG. 3 is a rear elevation of the abrading machine of FIG. 1.

FIG. 4 is a front elevation of the abrading machine of FIG. 1.

FIG. 10 is a side view of an abrading machine constructed in accordance with the present invention and having a cyclone separator and an elevator assembly.

DETAILED DESCRIPTION OF THE PREFERRED EMBODIMENTS

Figure 1:
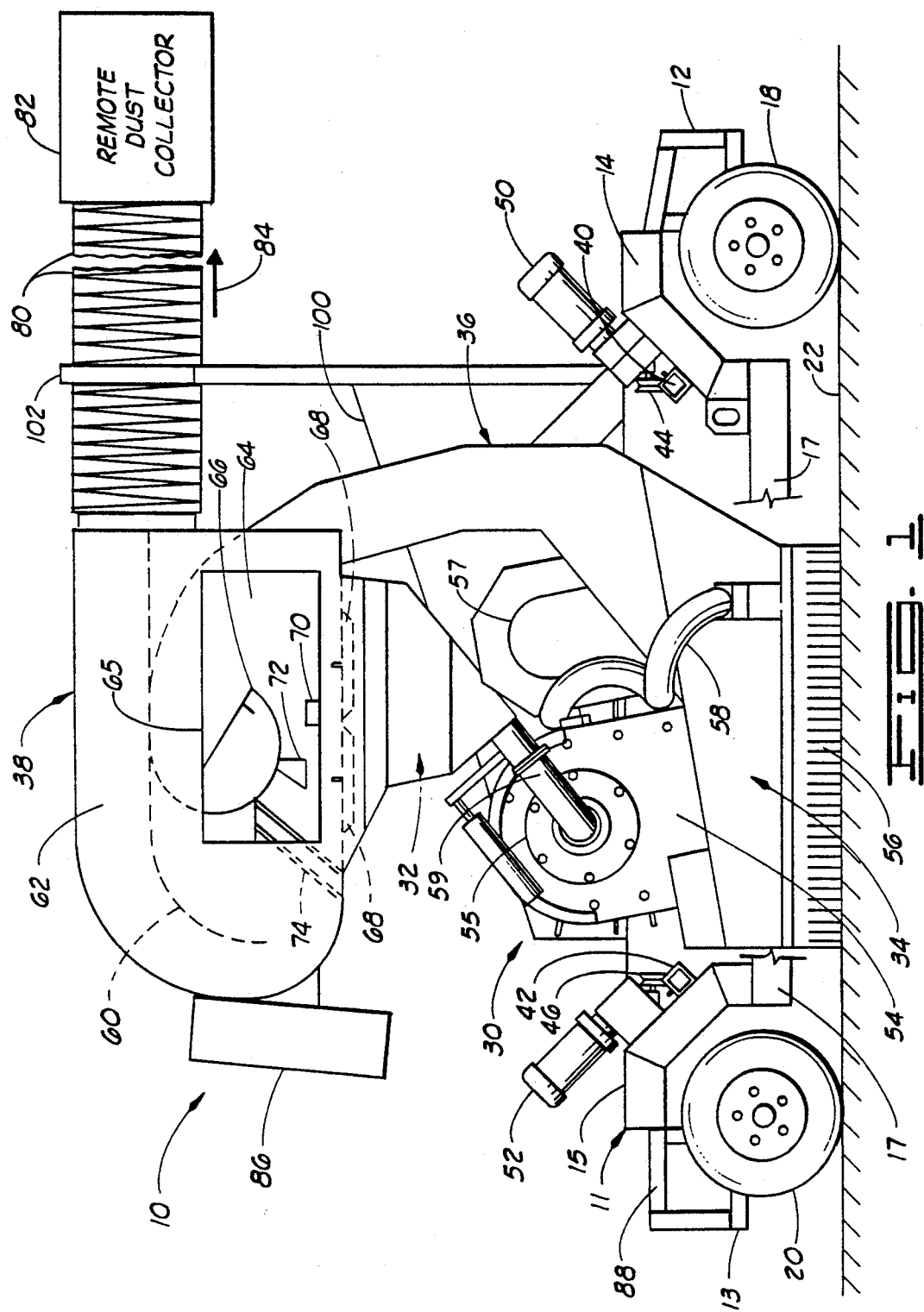
FIG. 1 is a side elevation of an abrading machine constructed in accordance with the present invention.

Referring to the drawings in detail and to FIGS. 1 through 4 in particular, shown therein and designated by the general reference numeral 10 is an abrading machine constructed in accordance with the present invention.

The machine 10 comprises a frame 11 having a front end 12 and a rear end 13. The frame 11 includes a front cross member 14, a rear cross member 15, a left side member 16 and a right side member 17. A portion of the right side member 17 in FIG. 1 is cut away for purposes of illustration. A set of front wheels 18 and rear wheels 20 are attached to the frame 11 to enable the machine 10 to travel over a surface 22 to be abraded.

A blast assembly 30 is mounted upon the frame 11 for propelling abrasive material against the surface 22. The blast assembly 30 comprises a feed hopper 32, a blast housing 34, a return housing 36 and an air wash 38.

A pair of track members 40 and 42 are rigidly secured across the frame 11. One track member 40 extends across the frame 11 toward the front end 12 and the other track member 42 extends across the frame 11 toward the rear end 13. A pair of rollers 44 and 46 is positioned on each track member 40 and 42.

As illustrated by FIG. 1, each track member 40 and 42 is square in cross-section and secured to the frame 11 with an edge upward. The rollers 44 and 46 are V-shaped in cross-section to fit upon the upward edge of the corresponding track member 40 and 42. The matching arrangement of the track members 40 and 42 with the V-shaped rollers 44 and 46 prevents each set of rollers 44 and 46 from being dislodged from the corresponding track members 40 and 42.

A pair of variable-speed electric motors 50 and 52 are mounted to the frame 11 to drive the blast assembly 30 back and forth across the frame 11 on the rollers 44 and 46 and track members 40 and 42. One motor 52 drives the blast assembly 30 over the rear track member 42 and the other motor 50 drives the blast assembly 30 over the front track member 40.

The blast housing 34 includes a blast corridor 54 and a lower end having a blast opening to the surface 22 being abraded. A conventional motor-driven, center-fed centrifugal blast wheel 55 is attached to the blast housing 34. The centrifugal blast wheel 55 has a plurality of rotating blades extending into the blast corridor 54 to propel abrasive material through the blast opening against the surface 22.

An elastomeric skirt 56 is attached to the lower end of the blast housing 34 and extends downward to contact the surface 22 around the perimeter of the blast opening. The skirt 56 is provided to contain abrasive material and dust within the blast housing 34. A lower portion of the skirt 56 may be fringed to allow the skirt 56 to conform to the surface 22 and to travel easily over the surface 22.

A blast blower 57 is mounted to the blast housing 34 and supplies a downward air flow at each side of the blast housing 34. The blast blower 57 is connected to a pair of blower ducts 58 which communicate into the blast housing 34. The downward rush of air at the inner side wall of the blast housing 34 assists in preventing abrasive material and dust from escaping under the sides of the blast housing 34.

Continuing to refer to FIG. 1, the hopper 32 of the blast assembly 30 is positioned above the blast housing 34. The hopper 32 contains a supply of abrasive material to be fed into the blast corridor 54 of the blast housing 34. A feed tube 59 extends from the lower end of the hopper 32 to the blast corridor 54 of the blast housing 3 to allow gravity feed of abrasive material from the hopper 32 into the blast corridor 54.

Toward the front of the blast assembly 30, the return housing 36 extends upward and rearward and forms a return corridor from the blast opening to the air wash 38, which is located above the hopper 32. Kinetic energy of the abrasive material bouncing off the surface 22 propels the abrasive material at least part of the way through the rebound corridor.

A separating wall 60 extends from side to side of the air wash 38 to divide the air wash 38 into an upper chamber 62 and a lower chamber 64. As shown in FIG. 1, the separating wall 60 runs horizontally from the front of the air wash 38 and curves downward toward the rear of the air wash 38.

As shown in FIG. 1, the lower chamber 64 of the air wash 38 has an access opening 65 for cleaning out the air wash 38 and for adding abrasive material. The access opening 65 is covered by a latching door (not shown) while the machine 10 is in operation.

A half-cylindrical collection chamber 66 is mounted within the lower chamber 64 of the air wash 38. The half-circle ends of the collection chamber 66 are solid and the rectangular upper side is open to receive abrasive material. The bottom of the collection chamber 66 is slotted to allow abrasive material to fall from the collection chamber 66 into the hopper 32. A pair of chutes 68 re located in the bottom of the lower chamber 64 to feed abrasive material from the lower chamber 64 into the hopper 32.

In order for the machine 10 to maintain suitable air flow, abrasive material and other solid objects should be restricted from entering the upper chamber 62 of the air wash 38. To accomplish this purpose, a set of baffles and screens are positioned in the air wash 38. As illustrated by FIG. 1, one baffle 70 is attached to the lower end of the air wash 38 and another baffle 72 is secured to the underside of the collection chamber 66.

A plurality of screens 74 are positioned to the rear of the collection chamber 66. The screens 74 have perforations which allow air to pass from the lower chamber 64 to the upper chamber 62, but prevent movement of abrasive material and other objects from the lower chamber 64 to the upper chamber 62.

With continued reference to FIG. 1, a pair of flexible ducts 80 are connected to the front end of the upper chamber 62 of the air wash 38. The ducts 80 run to a remote dust collector 82 which is mounted on the lead vehicle (not shown). A suitable remote dust collector 82 is disclosed in U.S. Pat. No. 4,618,352 issued to Nelson on Oct. 21, 1986, which is hereby incorporated by reference. The remote dust collector 82 produces an air flow indicated by direction arrow 84 to draw air from the blast opening through the return corridor of the return housing 36, the lower chamber 64, the upper chamber 62 and out the front of the air wash 38.

Turning attention to the rear of the machine 10, an operator's console 86 is mounted to the back of the air wash 38. The operator's console 86 includes conventional switches, meters and controls for monitoring and operating the various motors and other electrical components of the machine 10. An operator's platform 88 is attached to the rear 13 of the frame 1 to provide a place for the operator to stand while operating the machine 10.

At this point, it should be understood that the abrading machine 10 and the lead vehicle are operated in tandem. In addition to the remote dust collector 82, an electric power generator with a rating in the range of 325 kilowatts is mounted on the lead vehicle. Electric power cables run between the generator on the lead vehicle to the machine 10 to power the fans, motors and other electrical components of the abrading machine 10. The operators of the lead vehicle and the abrading machine 10 communicate by radio to coordinate the operation of the lead vehicle with that of the abrading machine 10.

Figure 2:
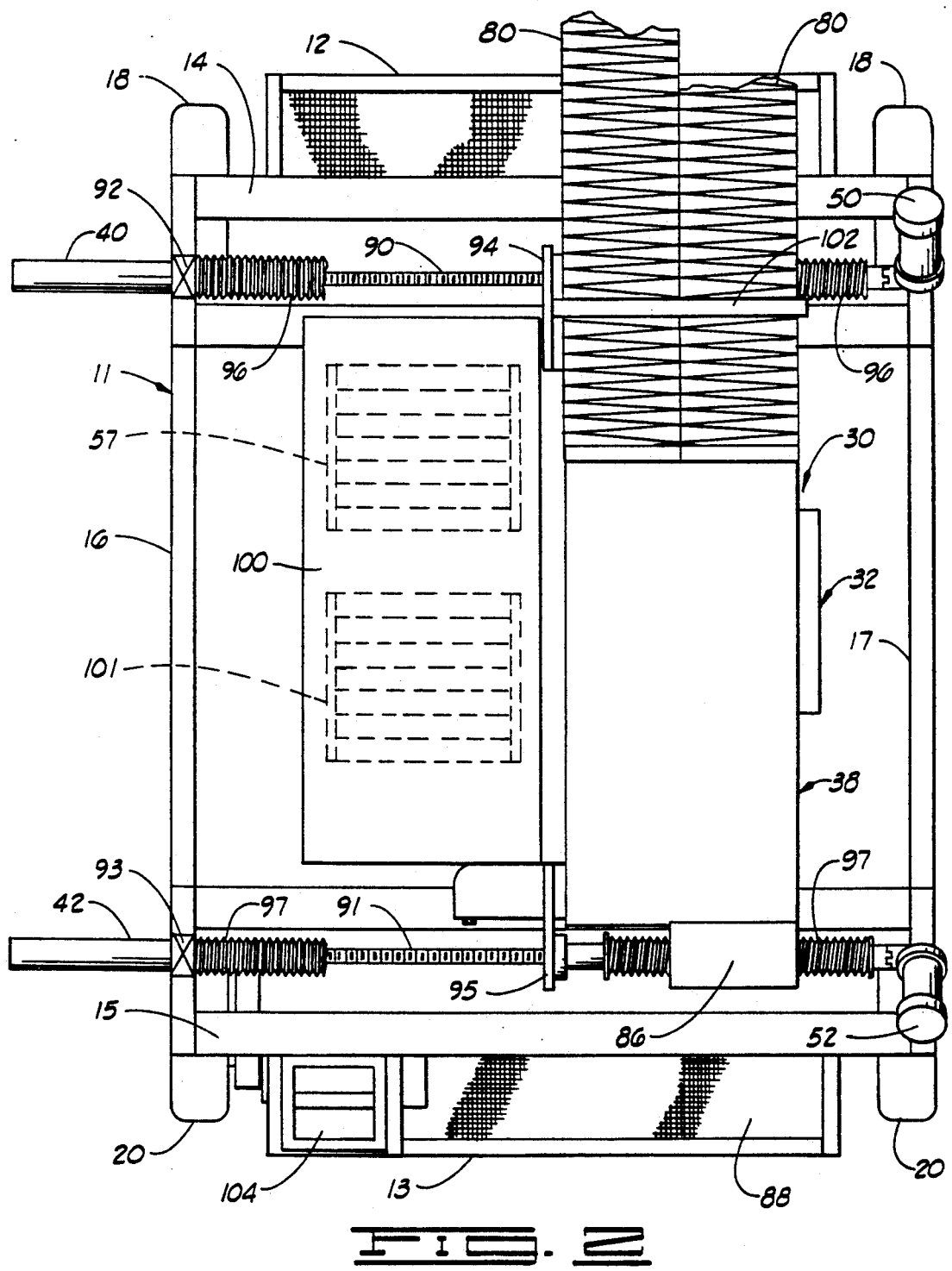
FIG. 2 is a plan view of the abrading machine of FIG. 1.

Turning now to FIGS. 2 through 4, the construction of the machine 10 for transverse movement of the blast assembly 30 on the track members 40 and 42 is described in detail. As best shown in FIG. 2, a pair of worm drive shafts 90 and 91 are journaled into a pair of pillow blocks 92 and 93 which are mounted to the left side member 16 of the frame 11. One worm drive shaft 90 extends substantially parallel with and above the front track member 40 and the other worm drive shaft 91 runs substantially parallel with and above the rear track member 42.

A pair of reversible, variable-speed electric motors 50 and 52 are mounted to the right side member 17 of the frame 11. The motors 50 and 52 are connected to the worm drive shafts 90 and 91 respectively to rotate the worm drive shafts 90 and 91.

A pair of couplings 94 and 95 are mounted to the blast assembly 30 to connect the blast assembly 30 to the worm drive shafts 90 and 91 for transverse movement. One coupling 94 is attached to the front of the blast assembly 30 and the other coupling 95 is attached to the rear of the blast assembly 30.

Each coupling 94 and 95 has a worm drive bore which is shaped to receive one of the worm drive shafts 90 and 91. One of the worm drive shafts 90 and 91 is journaled through the worm drive bore of the corresponding coupling 94 and 95 to move the blast assembly 30 transversely in response to the rotation of the worm drive shafts 90 and 91. It should be appreciated that the worm drive shafts 90 and 91 are rotated in concert to maintain the blast assembly 30 in alignment with the frame II.

If left uncovered, the worm drive shafts 90 and 91 would be exposed to dirt and grit which would adversely affect the transverse movement of the blast assembly 30. To prevent this problem, the worm drive shafts 90 and 91 are journaled through flexible, accordion-like coverings 96 and 97, respectively. Portions of the coverings 96 and 97 are cut away in FIGS. 2 through 4 to illustrate the worm drive shafts 90 and 91 more clearly.

As best shown in FIG. 2, an auxiliary housing 100 covers the blast blower 57 and motor 101 for the blast wheel 55. It should be appreciated that the auxiliary housing 100 is to the side of the blast housing 34 and blast opening. In order for the blast opening to travel across to the left side member 16, the auxiliary housing 100, the blast blower 57 and blast wheel motor 101 must extend beyond the left side member 16 of the frame 11. To accommodate this extended movement, the track members 40 and 42 extend past the left side member 16 to support the blast assembly 30 at its leftmost movement.

The position of the flexible ducts 80 leading to the remote dust collector 82 are illustrated by FIG. 2. A bracket 102 is secured to the frame II and supports the flexible ducts 80.

With reference to FIGS. 2 and 3, a drive motor 104 is mounted to the rear 13 of the frame 11 for rotating the rear wheels 20 to move the machine 10. The drive motor 104 is a reversible, variable-speed electric motor connected to the rear wheels 20 and controlled from the operator's console in a conventional manner.

As best shown in FIGS. 2 and 4, the front wheels 18 of the machine 10 are equipped with a suitable steering mechanism. The steering of the machine 10 is also controlled from the operator's console in a conventional manner.

The arrangement of the front rollers 44 and back rollers 46 upon the track members 40 and 42 respectively is best shown in FIGS. 3 and 4. Although the number of rollers 44 and 46 employed may vary, two front rollers 44 and two back rollers 46 are typically used to provide support and movement of the blast assembly 30 upon the track members 40 and 42.

OPERATION

Figure 5:
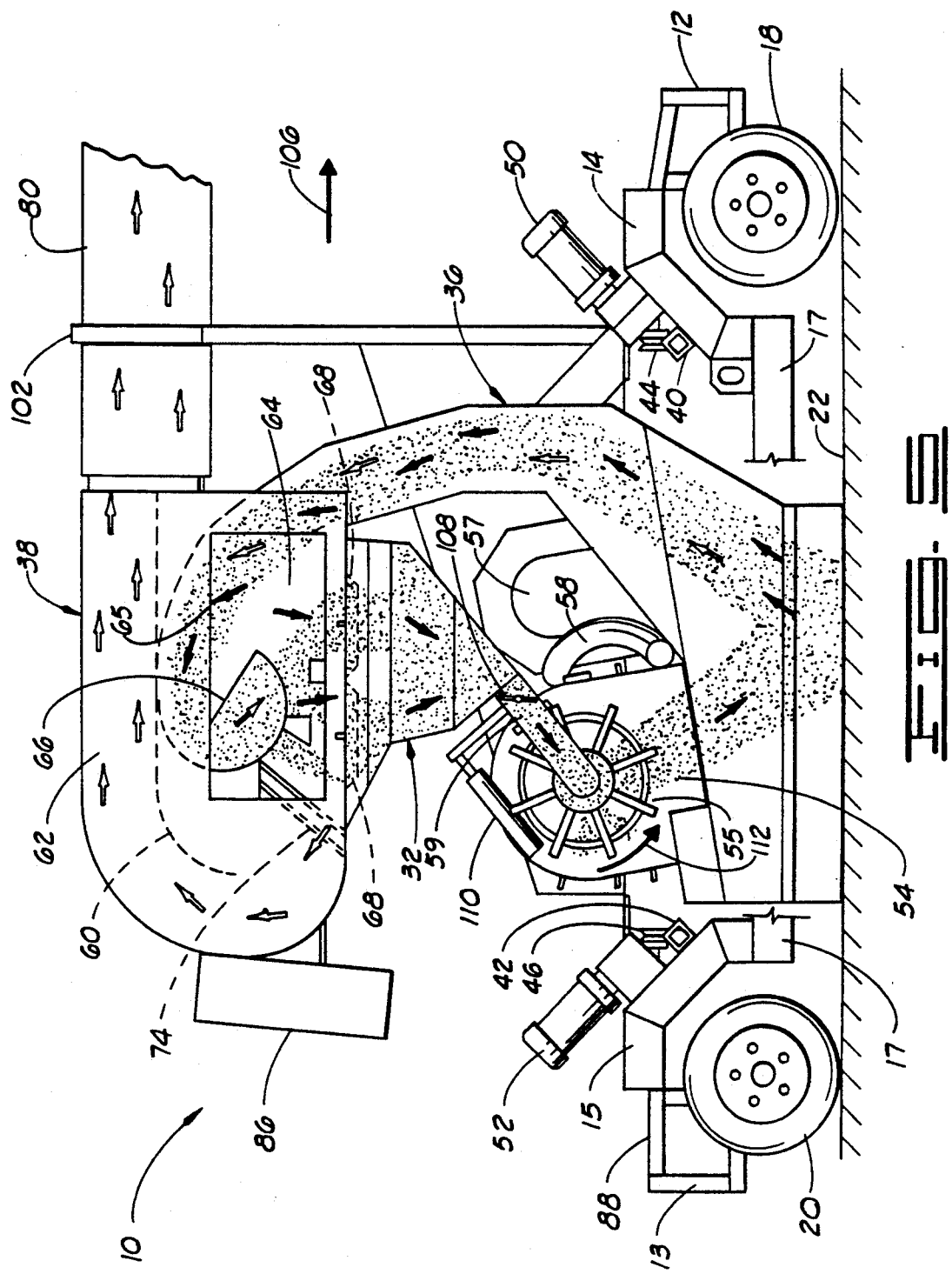
FIG. 5 is a partly diagrammatical side view of the abrading machine of FIG. 1 illustrating the travel path of air and abrasive material.

With reference now to FIG. 5, the operation of the machine 10 is described in detail. It should be understood that the operator steers and drives the machine 10 forward as indicated by direction arrow 106 while oscillating the blast assembly 30 transversely across the frame 11 upon the track members 40 and 42.

In illustrating the movement of air and abrasive material in the machine 10, solid arrows designate the travel path of abrasive material and hollow arrows indicate the direction of air flow.

Beginning at the hopper 32, abrasive material falls through the feed tube 59 into the blast corridor 54 of the blast housing 34. The operator controls the position of a feed valve 108 to set the transfer rate of abrasive material from the hopper 32 to the blast corridor 54. Conventional electrohydraulic controls and a hydraulic valve 110 are connected to the feed valve 108 to allow the operator to adjust the amount of abrasive material entering the blast corridor 54 of the blast housing 34.

The centrifugal blast wheel 55 rotates as indicated by direction arrow 112 such that its blades propel abrasive material in the blast corridor 54 through the blast opening and against the surface 22. The blast blower 57 produces an air flow from each side of the blast housing 34 to assist in directing the abrasive material to the blast opening.

Upon striking the surface, the abrasive material rebounds by kinetic energy into the return corridor of the return housing 36. The kinetic energy of the abrasive material and the air flow from the remote dust collector 82 provide sufficient force to move at least a portion of the abrasive material from the blast opening to the collection chamber 66 of the air wash 38.

Abrasive material then falls through the slotted bottom of the collection chamber 66, through the chutes 68 in the bottom of the air wash 38 and into the hopper 32 to be used again. Dust-laden air, on the other hand, travels through the screens 74 in the lower chamber 64 of the air wash 38 into the upper chamber 62 of the air wash 38 and through the flexible ducts 8 to the remote dust collector 82.

From the operator's console 86, the operator manually controls the speed and direction of the machine 10, the speed and direction of transverse movement of the blast assembly 30 and the amount of abrasive material being fed to the blast corridor 54 of the blast housing 34. Typically, the operator of the machine 10 is in radio communication with the operator of the lead vehicle to coordinate the movement of the lead vehicle with the movement of the machine 10.

Embodiment of FIGS. 6–9

Figure 6:
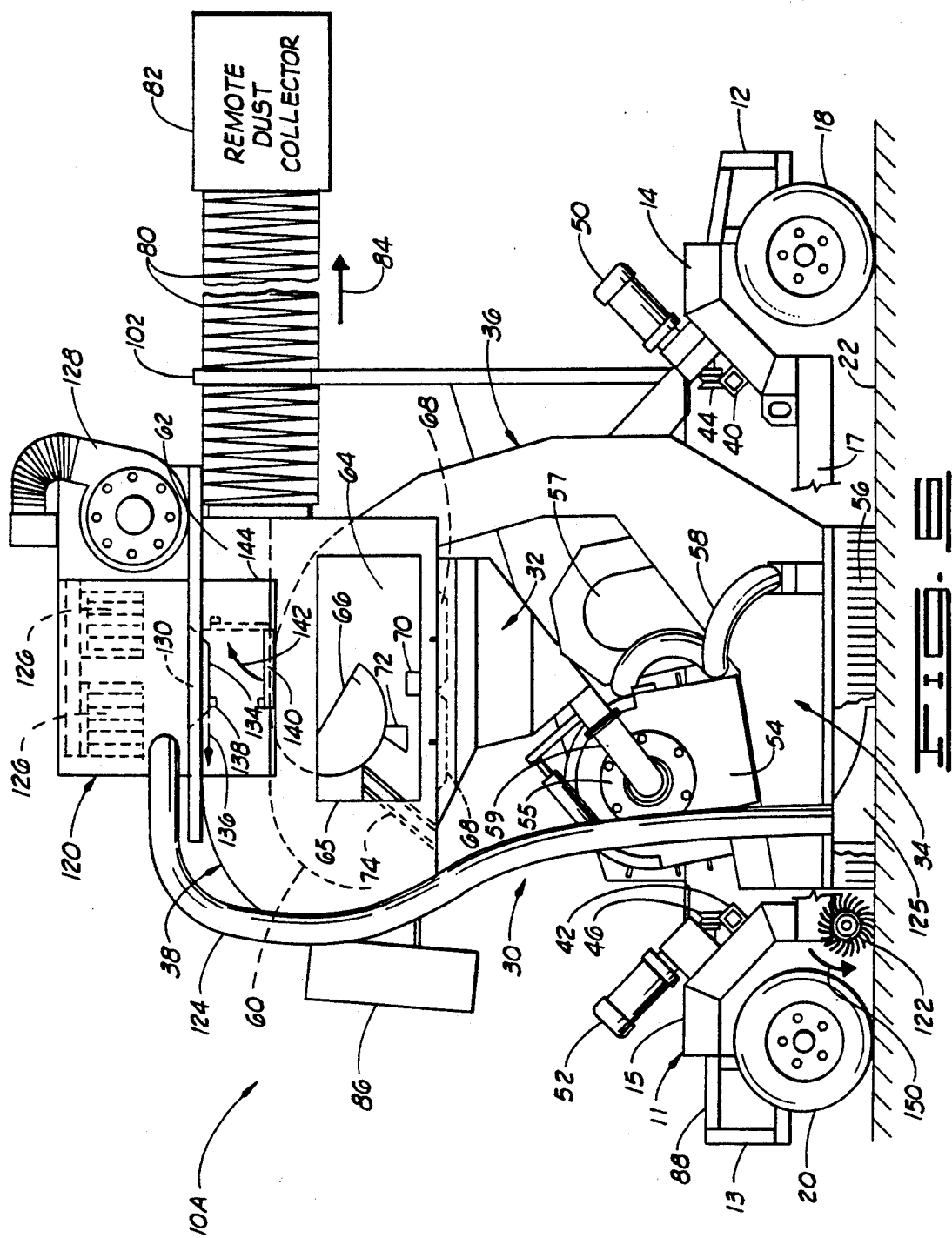
FIG. 6 is a side view of an abrading machine constructed in accordance with the present invention and having an on-board dust collector.

In making deeper cuts into the surface, the kinetic energy of the abrasive material and the air flow from the remote dust collector 82 may not be sufficient to move all of the abrasive material from the blast opening to the collection chamber 66 of the air wash 38. As illustrated by FIG. 6, an on-board dust collector 120 may be mounted upon the air wash 38 and a rotating broom 122 may be attached to the blast housing 34 to recover more of the spent abrasive material.

The on-board dust collector 120 is basically a small version of the dust collector disclosed in U.S. Pat. No. 4,618,352 issued to Nelson on Oct. 21, 1986, which is hereby incorporated by reference. A pair of vacuum ducts 124 extend from the inlet of the on-board dust collector 120 to the blast opening, one vacuum duct 124 on each side of the blast housing 34. As shown in FIG. 6, the vacuum ducts 124 have lower ends 125 which communicate with the blast area toward the rear of the blast housing 34. A portion of the skirt 56 is cut away to show the lower ends 125 of the vacuum ducts 124 within the blast housing 34.

The on-board dust collector 120 is equipped with two fans. One fan, a vacuum fan (not visible in FIG. 6), draws air from the blast opening, through the vacuum ducts 124 into the on-board dust collector 120 and out an air outlet of the on-board dust collector 120. A plurality of air filters 126 ar mounted within the on-board dust collector 120 to remove dust from the air flowing through the on-board dust collector 120.

The other fan of the on-board dust collector 120 is a reverse-flow blower 128 which produces a reverse air flow through the on-board dust collector 120 to remove dust from the air filters 126 of the on-board dust collector 120. A variety of blowers are suitable for use as the reverse-flow blower 128. An acceptable reverse-flow blower 128 is any conventional blower capable of producing a relatively low pressure (about 1 inch of lift) air flow in the range of 1,500 cubic feet per minute.

Continuing to refer to FIG. 6, a collection tray 130 is located in the bottom of the on-board dust collector 120 to receive abrasive material drawn up into the on-board dust collector 120 through the vacuum ducts 124. The lower end of the collection tray 130 has a dump opening to allow abrasive material to be transferred from the collection tray 130 into the upper chamber 62 of the air wash 38. The dump opening is covered by a dump door 134 which is adapted to slide open as indicated by direction arrow 136. A handle 138 is attached to the dump door 134 for opening and closing the dump door 134.

In order to be reused, abrasive material must be moved from the collection tray 130 to the hopper 32. Thus the separating wall 60 of the air wash 38 has a transfer opening which is vertically aligned with the dump opening of the collection tray 130. The transfer opening is covered by a transfer door 140 which opens by pivoting as indicated by direction arrow 142. With the dump door 134 open and the transfer door 140 open, abrasive material may freely fall from the collection tray 130 through the upper and lower chambers 62 and 64 of the air wash 38 and into the hopper 32 for reuse.

The upper chamber 62 of the air wash 38 has an access opening 144 allowing the operator to open and close the dump door 134 and the transfer door 140. During abrading operations, the access opening 144 is covered by a locking door (not shown).

As an additional mechanism for recovering spent abrasive material, the rotating broom 122 may be attached to the rear of the blast housing 34. In this embodiment, the blast housing 34 should have a recapture opening extending across the rear of the blast housing 34 at the surface 22. The broom 122 is constructed with a plurality of resilient bristles in contact with the surface 22.

The broom 122 is rotated by an electric motor (not shown) as indicated by direction arrow 150 to sweep abrasive material back into the blast housing 34 through the recapture opening. Once back inside the blast housing 34, the abrasive material is picked up by the air flow of the on-board dust collector 120 or the remote dust collector 82.

Figure 7:
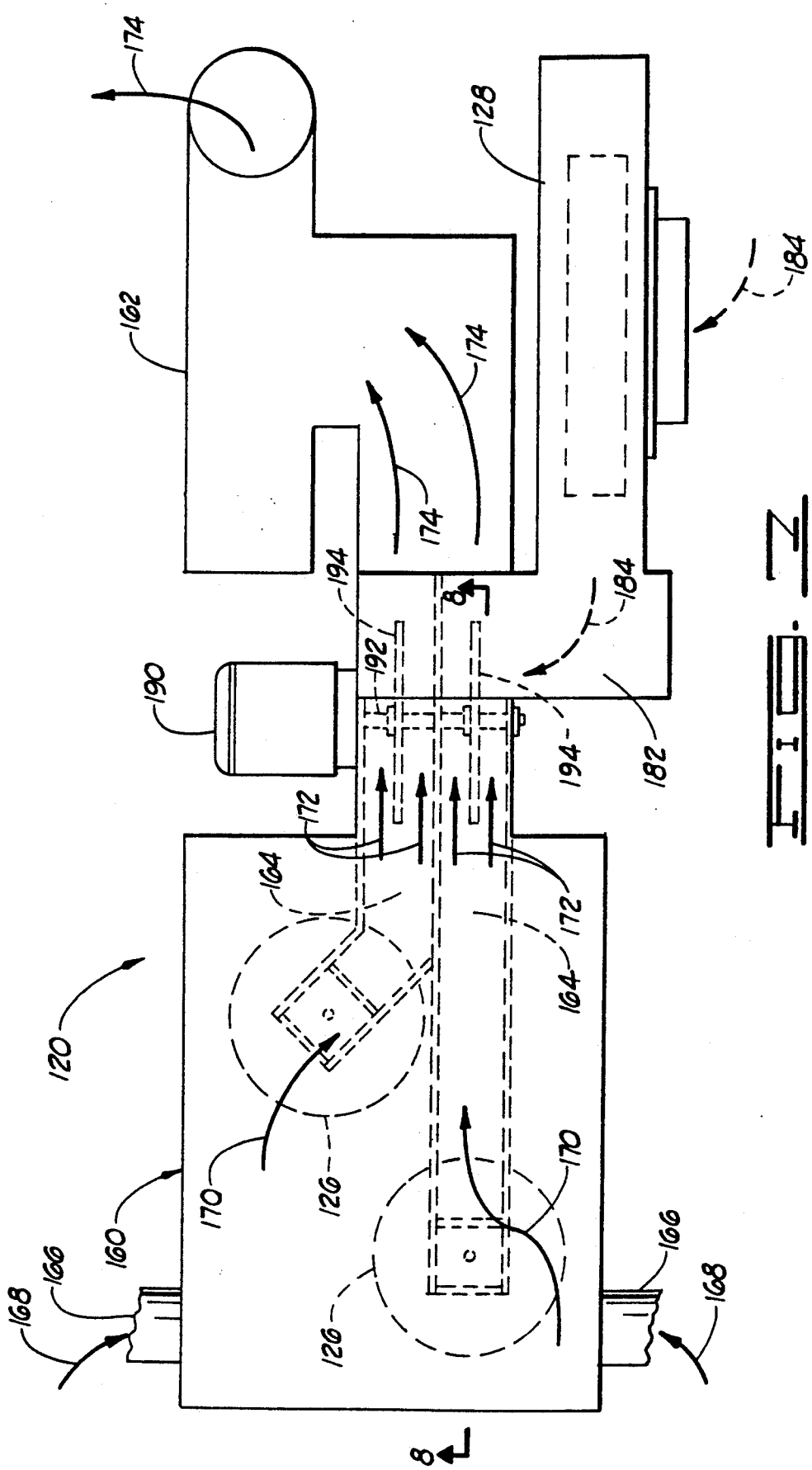
FIG. 7 is a top view of the on-board dust collector of FIG. 6.
Figure 8:
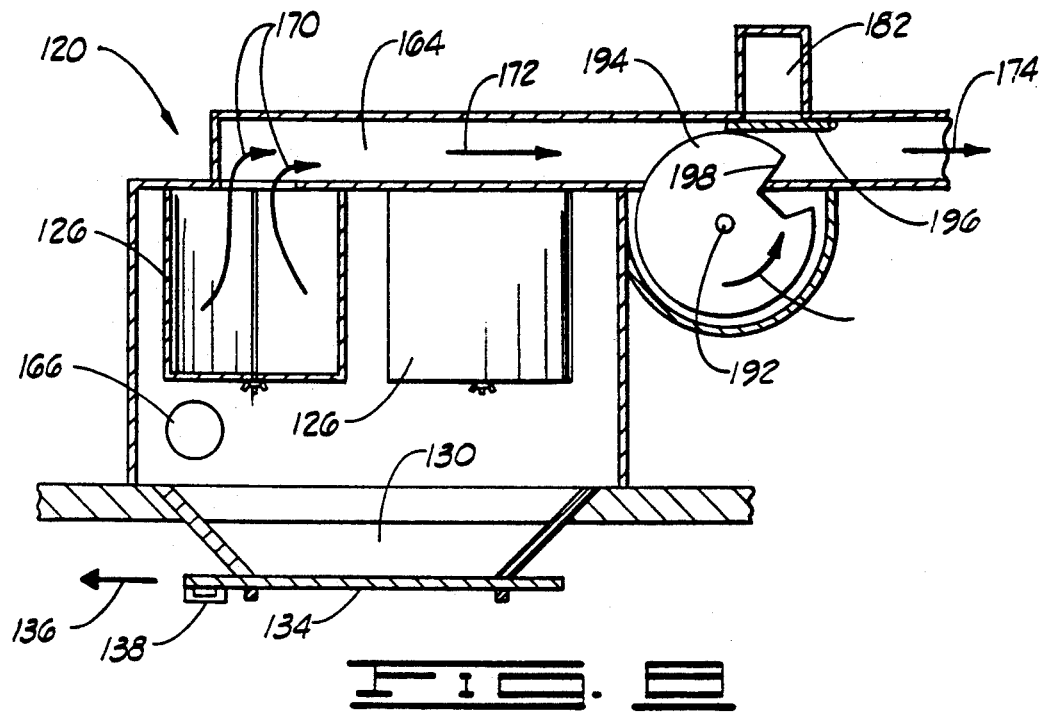
FIG. 8 is a partly diagrammatical view of a portion of the on-board dust collector taken along the lines 8—8 of FIG. 7 and illustrating the abrading mode.
Figure 9:
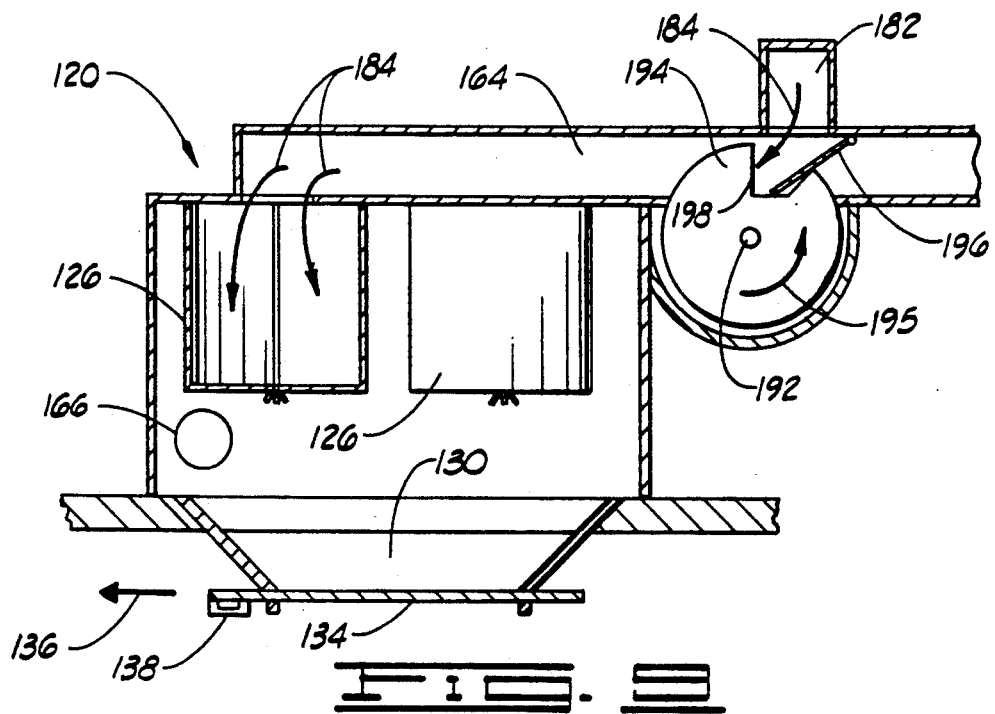
FIG. 9 is the portion of the on-board dust collector of FIG. 8 illustrating the filter-cleaning mode.

With reference now to FIGS. 7 through 9, the on-board dust collector 120 is described in detail. The dust removal components of the on-board dust collector 120 include a dust collector housing 160, the air filters 126 positioned within the dust collector housing 160, the vacuum fan 162 for drawing air through the air filters 126 and a plurality of air filter ducts 164. The vacuum fan 162 may be any conventional fan capable of producing a air flow in the range of 1,000 cubic feet per minute with approximately 40 inches of lift.

The dust collector housing 160 includes a pair of inlets 166 with each inlet 166 connected to one of the vacuum ducts 124 running to the lower end of the blast housing 34. As indicated by direction arrows 168 in FIG. 7, air is drawn by the vacuum fan 162 from each side of the blast housing 34 through the vacuum ducts 124 and into each side of the dust collector housing 160.

Once inside the dust collector housing 160, air is drawn through the air filters 126, as illustrated by direction arrows 170, to remove dust. After dust is removed from the air, the air is drawn through the air filter ducts 164, as indicated by direction arrows 172, and out of the on-board dust collector housing 160, as depicted by direction arrows 174.

Abrasive material and heavier dust fall into the collection tray 130. Light-weight dust particles, however, collect on the outer surface of the air filters 126. In order to remove dust from the air filters 126, the on-board dust collector 120 is provided with the reverse-flow fan 128 and a transverse duct 182, which communicates with each of the air filter ducts 164. As shown in FIG. 7, the reverse-flow fan 128 creates a reverse air flow through the transverse duct 182, the air filter ducts 164 and the air filters 126 to knock dust from the outer surface of the air filters 126.

Of course, it is inefficient to have air flows opposing one another through the air filters 126 and air filter ducts 164. Therefore it is desirable to limit air flow through the air filters 126 and air filter ducts 164 to one direction at a time. In order to accomplish this purpose, a motor 190 is mounted to the on-board dust collector 120 and is connected to a shaft 192 extending through the air filter ducts 164. A disc 194 is attached to the shaft 192 for rotation within each duct 164 as indicated by direction arrow 195.

As illustrated by FIGS. 8 and 9, a vane 196 is mounted to the upper wall of each duct 164 and extends across its respective duct 164. Each disc 194 has a circumferential notch 198 which is sized and shaped to allow the corresponding vane 196 to drop into the notch 198 and to the lower wall of the duct 164 when the disc 194 pivots to the position shown in FIG. 9. When the vane 196 is not within the notch 198, as shown in FIG. 8, the vane 196 is held against the upper wall of duct 164 by the disc 194.

When the vane 196 is not in the notch 198 of the disc 194, as shown in FIG. 8, air is drawn by the vacuum fan 162 from the inlets 166 through the air filter 126 and duct 164 and out of the on-board dust collector 120. Air flow to the transverse duct 182 is blocked by the vane 196 and dust is removed from the air by the air filter 126.

When the vane 196 is in the position shown in FIG. 9, air from the reverse-flow fan 128 is blown through the transverse duct 182 through the duct 164 and air filter 126 to force dust from the outer surface of the air filter 126. Dust falls from the air filter 126 into the collection tray 130 at the bottom of the on-board dust collector 120. The vane 196 blocks air flow caused by the vacuum fan 162.

The discs 194 are typically positioned on the shaft 192 with the notches 198 angularly displaced from one another. In this manner, the vanes 196 operate sequentially to block vacuum air flow and to allow reverse air flow to their respective air filters 126.

It should be appreciated that various numbers of air filters 126 and air filter ducts 164 may be constructed within the on-board dust collector 120 and that the number selected is a matter of design. The dust removal and filter cleaning functions may be performed by the on-board dust collector 120 simultaneously. The construction and operation of the on-board dust collector 120 for concurrent dust removal and filter cleaning is disclosed in U.S. Pat. No. 4,618,352 issued to Nelson on Oct. 21, 1986.

If filtering and cleaning are to be done concurrently, however, the filtering capacity of the on-board dust collector 120 is reduced by an amount proportional to the number of air filters 126 being cleaned by reverse air flow at any given time. With only two air filters 126, a fifty percent reduction in filtering capacity is incurred when one air filter is being cleaned. With a small number of air filters 126, therefore, it may be desirable to perform dust removal and filter cleaning as separate functions.

For dust removal without filter cleaning, the discs 194 are positioned on the shaft 192 so that the discs 194 cause all the vanes 196 to block the transverse duct 182, as illustrated by FIG. 8. The motor 190 should include a bias mechanism, such as a spring and ratchet (not shown) to rotate and hold the shaft 192 in the this position when the motor 190 is off. While in the abrading and dust removal mode, the motor 190 is off, the reverse-flow fan 128 is also off and the transverse duct 182 is blocked from all of the air filter ducts 164. Air is drawn through all the air filters 126 and air filter ducts 164 by the vacuum fan 162 while the surface 22 is being abraded by the machine 10.

To clean the air filters 126 after abrading a section of the surface, the operator stops the machine 10 and turns off the vacuum fan 162. The operator then turns on the motor 190 and the reverse-flow fan 128 to clean the air filters 126. After reverse air flow from the reverse-flow fan 128 has knocked dust from the air filters 126, the operator turns off the motor 190 and the reverse-flow fan 128.

While the machine 10 is stopped to clean the air filters 126, it is a convenient time to dump abrasive material from the collection tray 130 into the hopper 32 for reuse. With reference to FIG. 6, access to the collection tray 130 is gained through the access opening 144 in the upper chamber 62 of the air wash 38. Then the transfer door 140 is opened as indicated by direction arrow 142. In addition to providing a route for abrasive material from the upper chamber 62 into the lower chamber 64 of the air wash 38, the open transfer door 140 blocks air flow from the remote dust collector 82 while abrasive material is being dumped.

After the transfer door 140 is opened, the dump door 134 is moved rearward as indicated by direction arrow 136. With the dump door 134 and transfer door 140 open, abrasive material in the collection tray 130 falls freely through the dump opening of the collection tray 130 and the transfer opening of the separating wall 60 and into the lower chamber 64 of the air wash 38. From the lower chamber 64 of the air wash 38, abrasive material falls through the feed chutes 68 and into the hopper 32 as previously described.

To return the machine 10 to the operating mode, the dump door 134, the transfer door 140 and the access door are secured in closed positions. The vacuum fan 162 of the on-board dust collector 120 is turned on again, and the process of abrading the surface 22 is resumed.

Embodiment of FIG. 10

In some cases, it may be desirable to utilize a cyclone separator rather than the on-board dust collector 120 to recover residual abrasive material and to provide additional dust handling capacity. With reference to FIG. 10, an embodiment of the abrading machine with a cyclone separator 200 and designated by reference character 10B is described.

The cyclone separator 200 is mounted upon the air wash 38 and has a cyclone inlet 202 connected to the vacuum ducts 124, a cyclone dust outlet 204 communicating with the collection tray 130 and an air outlet 206 connected by an air duct 208 to a cyclone fan 210. The vacuum ducts 124 communicate with the blast housing 34 to transfer abrasive material from the blast area to the cyclone inlet 202. The cyclone fan 210 creates an air flow which pulls abrasive material and dust from the blast area and into the cyclone separator 200.

By centrifugal air flow in the cyclone separator 200, dust and abrasive material are forced downward through the dust outlet 204 and air is drawn out the air outlet 206 of the cyclone separator 200. A suitable cyclone separator 200 is the Cyclone Portable and Stationary Vacuum Cleaning System available from the Rotron Industrial Division of E, G and G in Saugerties, N.Y. The cyclone fan 210 may be any conventional fan capable of producing a high pressure (about 40 inches of lift) air flow in the range of 1,000 cubic feet per minute.

The dust and abrasive material which fall into the collection tray 130 are dumped in a manner similar to that described for the on-board dust collector 120. The machine 10B is stopped and the cyclone fan 210 is shut off. The access door, the transfer door 140 and the dump door 134 are opened and the abrasive material falls from the collection tray 130 through the air wash chambers 62 and 64 and into the hopper 32.

Elevator Assembly

When using abrasive material having a diameter of about one-eighth of an inch or greater or when abrading the surface 22 to a depth of about 3½ inches, kinetic energy of the abrasive material and air flow may be insufficient to return some of the abrasive material from the blast housing 34 to the air wash 38. Under these circumstances, it may be desirable provide an elevator assembly 220 within the return corridor of the return housing 36.

As illustrated by FIG. 10, the elevator assembly 220 extends from the lower end to the upper end of the return corridor of the return housing 36. It should be appreciated that the near side of the return housing 36 is not shown in FIG. 10 to illustrate the elevator assembly 220 more clearly.

The elevator assembly 220 includes an endless loop 222 mounted upon two pulleys 224 driven for rotation by an elevator motor (not shown). A plurality of buckets are attached to the endless loop 222. One of the buckets is designated by reference number 226 and is generally representative of the elevator buckets.

As the pulleys 224 rotate, the buckets 226 move with the rotation of the endless loop 222 in the direction indicated by direction arrows 228 to pick up abrasive material at the lower end of the return corridor and carry it to the upper end of the return corridor. At the upper end of the elevator assembly 220, the abrasive material falls from the buckets 226 into the lower chamber 64 of the air wash 38 and then into the hopper 32 for reuse.

In addition to use with the machine 10B having the cyclone separator 200, it should be understood that the elevator assembly 220 may be utilized in conjunction with the abrading machine 10A having the on-board dust collector 120 or with the abrading machine 10 having neither the cyclone separator 200 nor the on-board dust collector 120. Furthermore, it should be appreciated that the rotating broom 122 may be employed in combination with the various embodiments of the abrading machine designated by reference characters 10, 10A and 10B.

Changes may be made in the combinations, operations and arrangements of the various parts and elements described herein without departing from the spirit and scope of the invention as defined in the following claims.

What is claimed is:

1. A machine for abrading a surface by propelling abrasive material against the surface, the machine comprising:
   a wheeled frame having two side members;
   a pair of parallel track members extending between the side members of the frame;
   a blast housing movably supported upon the track members, the blast housing having a blast opening disposed toward the surface to be abraded;
   a blast wheel rotatably mounted within the blast housing and adapted to propel abrasive material through the blast opening against the surface to be abraded;
   a hopper communicating with the blast housing to feed abrasive material to the blast wheel and communicating with the blast opening to return abrasive material to the hopper for reuse; and
   oscillation means for moving the blast housing upon the track members to oscillate the blast housing over the surface to be abraded between the two side members of the frame.

2. A machine for abrading a surface by propelling abrasive material against the surface, the machine comprising:
   a wheeled frame having two side members;
   a pair of parallel track members extending between the side members of the frame;
   a blast assembly movably supported upon the track members; and
   oscillation means for moving the blast assembly upon the track members to oscillate the blast assembly over the surface to be abraded between the side members of the frame;
   wherein the blast assembly comprises:
      a blast housing having a front, a back, two sides, a blast corridor, and a lower end with a blast opening communicating with the blast corridor and defining a blast area of the surface to be abraded;
      a centrifugal blast wheel mounted to the blast housing and having a plurality of blades rotating within the blast corridor to propel abrasive material from the blast corridor through the blast opening against the surface to be abraded;
      a hopper with an upper end adapted to receive abrasive material and a lower end communicating with the blast corridor to feed abrasive material into the blast corridor;
      a return housing having a return corridor communicating with the blast opening; and
      an air wash communicating with the return corridor and the hopper to return abrasive material from the blast opening to the hopper for reuse.

3. The machine of claim 2 further comprising:
   a blast blower mounted to the blast assembly; and
   a pair of blower ducts communicating with the blast blower and opposing sides of the blast housing to create an air flow directing abrasive material from the blast corridor toward the blast opening.

4. The machine of claim 1 wherein the oscillation means further comprises:
   at least one pillow block attached to the frame proximate to a corresponding one of the track members;
   at least one worm drive shaft, each worm drive shaft having one end thereof rotatably journaled into a corresponding one of the pillow blocks to extend across the frame parallel to the corresponding track member;
   at least one coupling attached to the blast housing, each coupling having a worm drive bore receiving a corresponding one of the worm drive shafts for transverse movement of the blast housing in response to rotation of the corresponding worm drive shaft; and
   means for rotating each worm drive shaft.

5. The machine of claim 1 further comprising:
   a plurality of rollers rotatably secured to the blast housing and located to roll along the length of one of the track members and to support the blast housing upon the track members.

6. The machine of claim 5 wherein each track member has an angular upper edge and each roller is shaped to fit upon the angular upper edge of the track members.

7. The machine of claim 2 further comprising:
   a skirt attached to the blast housing around the blast opening to prevent abrasive material from escaping between the blast housing and the surface to be abraded.

8. The machine of claim 7 wherein the skirt comprises a fringed elastomeric material.

9. The machine of claim 2 further comprising:
   a feed tube extending from the lower end of the hopper to the blast corridor; and
   a feed valve positioned within the feed tube for controlling the amount of abrasive material fed from the hopper into the blast corridor.

10. The machine of claim 2 further comprising:
    an elevator assembly located within the return corridor and extending from a lower portion of the return corridor to the upper end of the feed hopper to lift abrasive material from the lower portion of the return corridor into the feed hopper for reuse.

11. The machine of claim 2 further comprising:
    a rotating broom extending along the rear of the blast housing in contact with the surface being abraded;
    wherein the rear of the blast housing has a recapture opening along the surface being abraded and the broom rotates to sweep abrasive material escaping from the blast housing back into the blast housing through the recapture opening.

12. The machine of claim 2 further comprising:
    a remote dust collector connected to the air wash, for producing an air flow from the blast opening through the return corridor and the air wash.

13. The machine of claim 12 wherein the air wash further comprises:
    a separating wall secured within the air wash to divide the air wash into an upper chamber and a lower chamber, the lower chamber communicating with the upper end of the return corridor to receive abrasive material from the blast area and with the hopper to transfer spent abrasive material into the hopper for reuse and the upper chamber communicating with the remote dust collector and with the lower chamber; and
    at least one screen positioned between the upper chamber and the lower chamber to prevent abrasive material from being drawn from the lower chamber into the upper chamber by the remote dust collector.

14. The machine of claim 13 further comprising:
a collection chamber located within the lower chamber of the air wash, the collection chamber having an open side for receiving abrasive material from the return corridor and a bottom with a plurality of slots for gravity feeding abrasive material into the hopper.

15. The machine of claim 14 further comprising:
an on-board dust collector having an inlet, an air outlet and a dust outlet;
a pair of vacuum ducts communicating with the inlet of the on-board dust collector and the blast housing to transfer residual dust, air and abrasive material from the blast housing to the inlet of the on-board dust collector; and
a vacuum fan connected to the air outlet of the on-board dust collector to create a vacuum air flow from the blast opening through the vacuum ducts and on-board dust collector and out the air outlet of the on-board dust collector;
a collection tray positioned in the lower end of the on-board dust collector to receive abrasive material from the dust outlet of the on-board dust collector, the collection tray having a lower end with a dump opening communicating with the upper chamber of the air wash; and
a dump door attached to the lower end of the collection tray and slidable between a closed position covering the dump opening and an open position allowing abrasive material to fall from the collection tray through the dump opening into the upper chamber of the air wash.

16. The machine of claim 15, wherein the separating wall of the air wash has a transfer opening therethrough vertically aligned with the dump opening and wherein the air wash further comprises:
a transfer door attached to the separating wall of the air wash and movable between a closed position covering the transfer opening and an open position wherein the transfer door blocks the air flow from the remote dust collector and allows abrasive material to fall from the upper chamber of the air wash into the lower chamber of the air wash.

17. The machine of claim 15 wherein the on-board dust collector further comprises:
an on-board dust collector housing;
a plurality of air filters disposed between the inlet and the air outlet of the on-board dust collector, each air filter having an air filter duct from the air filter to the air outlet of the on-board dust collector;
a transverse duct communicating with each air filter duct;
a reverse-flow mounted to the on-board dust collector and with the transverse duct to create a reverse air flow through each air filter;
a plurality of vanes mounted within the on-board dust collector housing, each vane corresponding to one of the air filter ducts and being movable between a first position wherein the vane blocks reverse air flow and a second position wherein the vane blocks vacuum air flow; and
rotatable means engaging the vanes for moving the vanes between the first and second positions.

18. The machine of claim 17 wherein the rotatable means comprising:
a shaft extending through the air filter ducts generally parallel with the transverse duct;
a plurality of discs mounted along the length of the shaft with each disc corresponding to one of the vanes and each disc having a notch in the circumference thereof for receiving the corresponding vane in the second position; and
a motor connected to the shaft for rotating the discs to move the vanes between the first and second positions.

19. The machine of claim 18 wherein the discs are positioned on the shaft with the notches angularly displaced relative to each other to provide sequential movement of the vanes to the second position one vane at a time.

20. The machine of claim 18 wherein the discs are positioned on the shaft with the notches displaced to provide a portion of the rotation of the shaft wherein all the vanes are in the first position.

21. The machine of claim 14 further comprising:
a cyclone separator mounted on the air wash and having an inlet for receiving dust-laden air, an air outlet and a dust outlet;
a pair of vacuum ducts communicating with the inlet of the cyclone separator and the blast housing to transfer residual dust, air and abrasive material from the blast housing to the inlet of the cyclone separator; and
a cyclone blower connected to the air outlet of the cyclone separator to draw air, dust and abrasive material from the blast housing through the vacuum ducts into the cyclone separator and to draw air out of the air outlet of the cyclone separator;
a collection tray positioned in the lower end of the on-board dust collector to receive abrasive material from the dust outlet of the on-board dust collector, the collection tray having a lower end with a dump opening communicating with the upper chamber of the air wash; and
a dump door attached to the lower end of the collection tray and slidable between a closed position covering the dump opening and an open position allowing abrasive material to fall from the collection tray through the dump opening into the upper chamber of the air wash.

22. The machine of claim 21 wherein the separating wall of the air wash has a transfer opening therethrough vertically aligned with the dump opening and wherein the air wash further comprises:
a transfer door attached to the separating wall of the air wash and movable between a closed position covering the transfer opening and an open position wherein the transfer door blocks the air flow from the remote dust collector and allows abrasive material to fall from the upper chamber of the air wash into the lower chamber of the air wash.

23. The machine of claim 1 further comprising:
motor means, connected to the blast wheel, for rotating the blast wheel to propel abrasive material against the surface being abraded.

24. The machine of claim 1 further comprising:
platform attached to the frame and adapted to support an operator of the machine.

25. The machine of claim 1 further comprising:
vacuum means, communicating with the blast opening and the hopper, for creating an air flow from the blast opening to the hopper to return spent abrasive material to the hopper for reuse.

* * * * *

UNITED STATES PATENT AND TRADEMARK OFFICE
CERTIFICATE OF CORRECTION

PATENT NO. : 5,291,697

DATED : March 8, 1994

INVENTOR(S) : Robert T. Nelson

It is certified that error appears in the above-indentified patent and that said Letters Patent is hereby corrected as shown below:

On the title page, item [54] and column 1, line 3, "OSCILLIATION" should read --OSCILLATION--.

Column 3, line 36, the number "3" should be --34--.

Column 3, line 64, "re" should be --are--.

Column 4, line 32, "1" should be --11--.

Column 5, line 10, "Il" should be --11--.

Column 5, line 34, "Il" should be --11--.

Column 6, line 27, "8" should be --80--.

Column 7, line 2, "Which" should be --which--.

Column 13, line 56, after "flow", insert --blower--.

Column 13, line 57, after "and", insert --communicating--.

UNITED STATES PATENT AND TRADEMARK OFFICE
CERTIFICATE OF CORRECTION

PATENT NO. : 5,291,697
DATED : March 8, 1994
INVENTOR(S) : Robert T. Nelson

It is certified that error appears in the above-indentified patent and that said Letters Patent is hereby corrected as shown below:

Column 13, line 68, "comprising" should be --comprises--.

Signed and Sealed this

Fourth Day of October, 1994

Attest:

BRUCE LEHMAN

Attesting Officer      Commissioner of Patents and Trademarks